(12) United States Patent (10) Patent No.: US 7,901,322 B2
Huen et al. (45) Date of Patent: Mar. 8, 2011

(54) ELECTRONIC CONTROL FUEL SAVE CLUTCH DEVICE FOR VEHICLE

(76) Inventors: Waikei Huen, Macau (CN); Yun Li, Macau (CN)

( * ) Notice: Subject to any disclaimer, the term of this patent is extended or adjusted under 35 U.S.C. 154(b) by 312 days.

(21) Appl. No.: 12/093,647

(22) PCT Filed: Nov. 15, 2005

(86) PCT No.: PCT/CN2005/001924
§ 371 (c)(1),
(2), (4) Date: Aug. 6, 2008

(87) PCT Pub. No.: WO2007/056888
PCT Pub. Date: May 24, 2007

(65) Prior Publication Data
US 2008/0287259 A1    Nov. 20, 2008

(51) Int. Cl.
*B60K 26/00* (2006.01)
(52) U.S. Cl. .................................... 477/173
(58) Field of Classification Search .............. None
See application file for complete search history.

(56) References Cited

U.S. PATENT DOCUMENTS

| | | | |
|---|---|---|---|
| 2,408,566 A * | 10/1946 | Mallory | 477/171 |
| 3,586,920 A * | 6/1971 | Wakamatsu et al. | 361/170 |
| 4,621,545 A | 11/1986 | Mohl | |
| 4,732,248 A * | 3/1988 | Yoshimura et al. | 477/171 |
| 4,842,113 A | 6/1989 | Lutz | |
| 6,951,525 B2 * | 10/2005 | Ries-Mueller | 477/74 |
| 7,153,235 B2 * | 12/2006 | Takamura et al. | 477/172 |

FOREIGN PATENT DOCUMENTS

CN        1044977        8/1990
(Continued)

OTHER PUBLICATIONS

International Search Report: PCT/CN2005/001924.
(Continued)

*Primary Examiner* — Dirk Wright
(74) *Attorney, Agent, or Firm* — Ladas & Parry LLP

(57) ABSTRACT

The present invention relates to an electronic control fuel saving clutch device for a vehicle, comprising: an electronic control clutch (7), a brake switch (8), an accelerator sensor (9) and an electromagnetic fuel line throttle valve (G) for opening and closing the accelerated fuel supply; the electronic control clutch and the electromagnetic fuel line throttle valve are controlled by the brake switch and signals emitted by the accelerator sensor, wherein when the brake switch is switched on, the electronic clutch is engaged, and the electromagnetic fuel line throttle valve is closed, and the engine is supplied only with the idle fuel supply; when the brake switch is switched off, if the accelerator sensor detects that the accelerator pedal (P) goes forward or keeps in a certain forward position, the electronic control clutch is engaged and the electromagnetic fuel line throttle valve is open, then the accelerating fuel supply is switched on, and the engine is supplied with the accelerating fuel supply; if the accelerator sensor detects that the accelerator pedal comes back or keeps in a certain back position, the electronic control clutch is disengaged, and the electromagnetic fuel line throttle valve is closed, then the accelerating fuel supply of the engine is cut off, and the engine is supplied only with the idle fuel supply.

10 Claims, 3 Drawing Sheets

FOREIGN PATENT DOCUMENTS

| | | |
|---|---|---|
| CN | 2071601 | 2/1991 |
| CN | 2089531 | 11/1991 |
| CN | 2130220 | 4/1993 |
| CN | 2232489 | 8/1996 |
| CN | 2736203 | 10/2005 |
| GB | 2 056 595 A | 3/1981 |
| JP | 60-193726 A | 10/1985 |
| JP | 61-093262 A | 5/1986 |
| JP | 83-18762 A | 12/1996 |
| JP | 2004-044800 A | 2/2004 |

OTHER PUBLICATIONS

European Search Report: EP 05 80 8235.

English Translation of Office Action mailed Nov. 26, 2010.

* cited by examiner

ELECTRONIC CONTROL FUEL SAVE CLUTCH DEVICE FOR VEHICLE

TECHNICAL FIELD OF THE INVENTION

The present invention relates to an electronic control fuel saving clutch device for a vehicle.

BACKGROUND OF THE INVENTION

It is well known that a vehicle can coast during running only depending on its own inertias without using any engine power. In the meantime, the engine may consume only little fuel for ensuring its idling. Thus, the vehicle coasting is a significant mode for saving fuel.

When a vehicle is running, according to Newtonian mechanics, the traction outputted by the engine can make the vehicle accelerated. During the movement, resistances on vehicle, such as wind resistances, increase as the vehicle velocity increases, until they balance the traction outputted by the engine. The vehicle is at last in uniform motion. When a driver releases the accelerator, the vehicle slows down due to the resistances, generally complying with the simplified formula as follows, $$R1+R2=ma; R2=K\mu$$

Wherein, R1 represents the wind resistance and the friction resistance; R2 represents the resistance produced by the vehicle power and transmission assembly; K is a gear coefficient, and the higher the gear is, the bigger K is, and the lower the gear is, the smaller K is; This is the reason why the coasting distance is rather longer while the vehicle is running at higher gears, and inversely shorter while running at lower gear; $\mu$ represents the damping of the vehicle power and transmission assembly. If the vehicle coasts without connecting the power and transmission assembly, as known from this formula, resistances on vehicle will become smaller, and the vehicle can coast a longer distance and thus can save more fuel.

In the known prior art, for example the Chinese patent ZL 02282639.4, an overrunning clutch is installed in the vehicle transmission system. When the vehicle decelerates, it is out of the engine damping via overrunning clutch in order to coast without the engine damping, and thus the purpose for saving fuel is attained. There is a serious safety problem in this technical scheme because the vehicle is correspondingly in the neutral coasting state. When the vehicle is braked suddenly, the deserved and necessary power assisted brake for braking system deteriorates due to the overrunning clutch relation between the engine and wheels, which affects the driving safety significantly. Additionally, when a driver puts back the accelerator, although the overrunning clutch makes the vehicle out of the engine damping, the engine is not in idle fuel supply state since the accelerator does not return, but still consumes more fuel than in idle fuel supply state. Therefore, ideal fuel saving effects can not be achieved in this known prior art. Furthermore, the vehicle equipped only with this device can not move backward.

The fuel supply to the engine is divided to two parts: one is the idle fuel supply for keeping the engine idling, another is the accelerating fuel supply controlled by the accelerator pedal. Both kinds of fuel supply can be fed not only by one fuel line, but also by several lines.

SUMMARY OF THE INVENTION

The present invention has an object to provide an electronic control fuel saving device for a vehicle. This electronic control fuel saving device has better fuel saving effects by controlling the accelerating fuel supply than the prior art has; in the meantime, it can ensure the vehicle safety in various running conditions.

According to the present invention, the electronic control fuel saving clutch device comprises an electronic control clutch, a brake switch, an accelerator sensor, furthermore, an electromagnetic fuel line throttle valve for opening and closing the accelerating fuel supply. The electronic control clutch and the electromagnetic fuel line throttle valve are controlled by the brake switch and signals emitted by the accelerator sensor in order to control the engagement or disengagement between the vehicle engine and wheels as well as the accelerating fuel supply of the engine. The specific control manner is: when the brake switch is switched on, the electronic clutch is engaged, and the electromagnetic fuel line throttle valve is closed, and the engine is supplied only with the idle fuel supply; when the brake switch is switched off, if the accelerator sensor detects that the accelerator pedal goes forward or keeps in a certain forward position, the electronic control clutch is engaged and the electromagnetic fuel line throttle valve is open, then the accelerating fuel supply is switched on, and the engine is supplied with the accelerating fuel supply; if the accelerator sensor detects that the accelerator pedal comes back or keeps in a certain back position, the electronic control clutch is disengaged, and the electromagnetic fuel line throttle valve is closed, then the accelerating fuel supply of the engine is cut off, and the engine is supplied only with the idle fuel supply. By the electronic control fuel saving clutch device according to the present invention, if the accelerator pedal comes back or keeps in a certain back position, the vehicle is in a coasting state out of the engine and transmission damping, therefore, the resistances on vehicle are reduced and thus fuel saving is implemented; when the vehicle is braked, the electronic control clutch is engaged, which makes high speed wheels engaged with the engine in gearing, so that the engine is transmitted in inherent gear ratio, and the rotating speed rises, and thus equivalent engine damping and power assisted brake without arranging the device of present invention is implemented.

The Electronic control clutch is arranged downstream of the engine in the transmission system, so the vehicle can be at least out of the engine damping when coasting. The electronic control clutch is preferably arranged on the rearmost stage transmission shaft so that the vehicle can be out of the engine damping and the transmission damping when coasting.

The electronic control clutch of the present invention can be carried out in various embodiments, for example, the electronic control clutch can be a friction clutch or a jaw clutch.

Preferably, the electronic control clutch can be engaged or disengaged in an electromagnetic control manner.

The brake switch can be carried out in various embodiments. For example, the brake switch can be a microswitch, a travel switch, an inductive switch or a contactless switch arranged on the brake pedal. Taking example for the microswitch, when the brake pedal is stepped on, the microswitch is activated and switched on; when the brake pedal is released completely, the microswitch is switched off.

The accelerator sensor can be carried out in various embodiments. For example, it can be an accelerator sensor which includes a disk with a groove and a contact, a contact arranged on the accelerator pedal and if necessary a damping wheel. The contact on the disk is arranged in the groove, which the contact on the accelerator pedal faces. Wherein, the rotating axis of the disk is coaxial with the rotating axis of the accelerator pedal. When the accelerator pedal is rotated forward, the contact on the accelerator pedal comes into contact with the contact on the disk and makes the disk to rotate together; when the accelerator pedal comes back, the accelerator pedal disconnects its contact from the contact on the disk and makes the disk come back together.

Additionally, another type of accelerator sensor can be adopted. This accelerator sensor is designed as a direct current generator, which is arranged on the rotating axis of the accelerator pedal, wherein the direct current generator comprises a rotor and a stator, and the rotor shaft is connected with the rotating axis of the accelerator pedal coaxially fixedly or through a gearing mechanism, and when the accelerator pedal rotates, the rotor rotates together. When the accelerator pedal goes forward or comes back, the direct current generator outputs an electromotive force with reverse polarity respectively. This electromotive force is converted to a corresponding switching on signal or a corresponding cutting off signal through a circuit, and even if the accelerator pedal is kept on a certain position when going forward or coming back, this switching on signal or cutting off signal is still effective.

The electronic control fuel saving clutch device according to the present invention can be applied to an existing vehicle equipped with overrunning clutches. In this case, the friction plates on one end of the electronic control clutch of the electronic control fuel saving clutch device of the present invention which can not rotate but can move axially with respect to an overrunning end of the overrunning clutch are arranged on this overrunning end, and the friction plates on the other end of the electronic control clutch which can not rotate but can also move axially with respect to a shaft end are arranged on this shaft end. Of course, alternatively, only the friction plates on one end of the friction plates on the two ends are moveable. Through the measures provided by the present invention, it is possible to improve the existing vehicle equipped with overrunning clutches at very low cost so as to ensure the vehicle security and to save fuel at the same time.

BRIEF DESCRIPTION OF THE DRAWINGS

The present invention will be embodied hereinafter by referring to the following figures. Wherein.

DETAILED DESCRIPTION OF THE EMBODIMENTS

Figure 1:
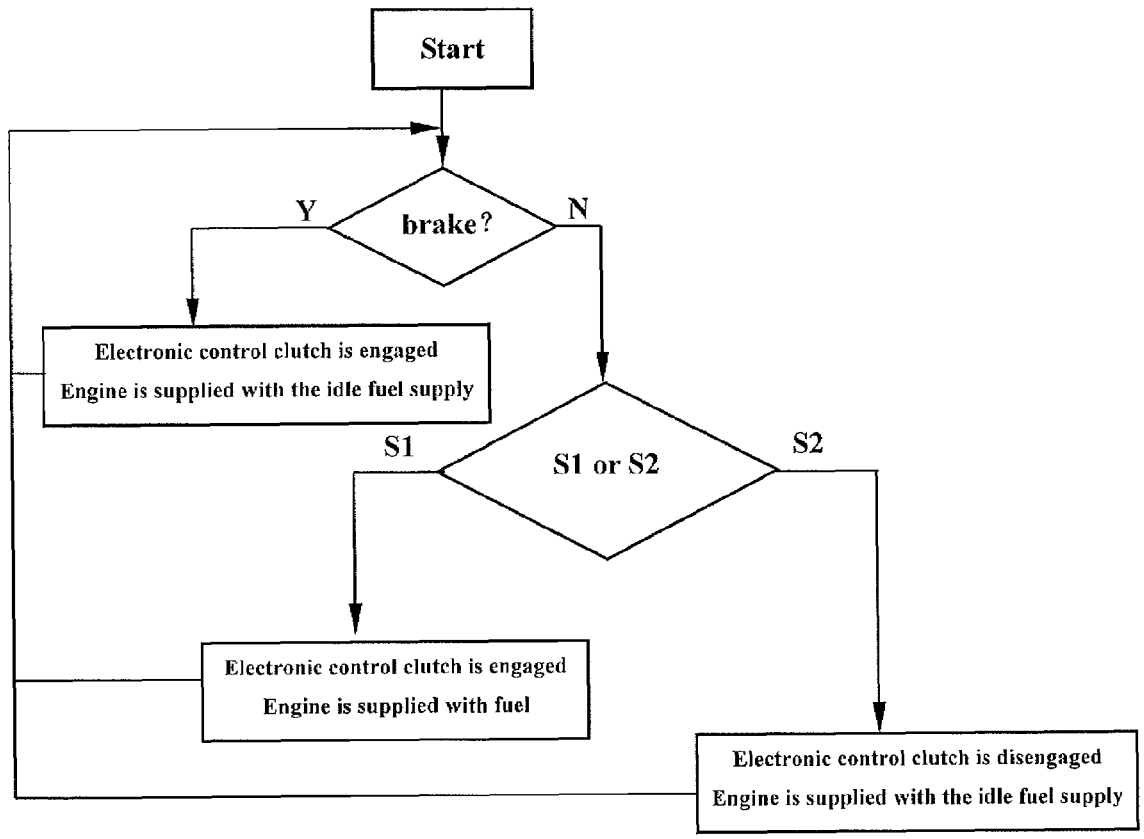
FIG. 1 shows a control logic framework chart of the electronic control clutch device according to the present invention.

FIG. 1 shows an electronic control fuel saving clutch device according to the present invention in a control logic framework chart. When the vehicle is started, the program starts to run. When a driver steps on the brake pedal P, a brake switch 8 is switched on, thus an electronic control clutch 7 is engaged, and the engine is supplied with the idle fuel supply. When the driver does not step on the brake pedal P, the brake switch 8 is switched off, and then the next step starts to run. If an accelerator sensor 9 detects that the accelerator pedal P goes forward or keeps in a certain forward position S1, the electronic control clutch 7 is engaged, and the engine is supplied with the accelerating fuel supply; if the accelerator sensor 9 detects that the accelerator pedal P comes back or keeps in a certain back position S2, the electronic control clutch 7 is disengaged, and the accelerating fuel supply of the engine is cut off, and the engine is supplied only with the idle fuel supply.

Figure 2:
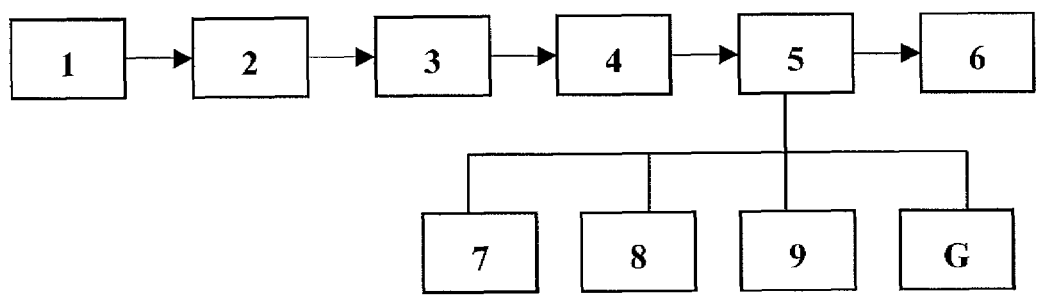
FIG. 2 shows a framework chart of the vehicle transmission system including the electronic control fuel saving clutch device according to the present invention.

FIG. 2 shows a vehicle transmission system including the electronic control fuel saving clutch device according to the present invention in a framework chart. This system mainly includes an engine 1, a clutch 2, a transmission 3, transmission shafts 4, an electronic control fuel saving clutch device 5 and wheels 6. Wherein, the electronic control fuel saving clutch device 5 includes an electronic control clutch 7, a brake switch 8 and an accelerator sensor 9. The electronic control fuel saving clutch device 5 further includes an electromagnetic fuel line throttle valve G. The electronic control clutch 7 of the present invention is arranged downstream of the engine 1, preferably on the rearmost stage transmission shaft.

Electromagnetic fuel line throttle valve G is arranged in the fuel line through which the engine is supplied with the accelerating fuel supply and used for throttling. Its logic relation is: when the electromagnetic fuel line throttle valve G is open, the accelerating fuel supply is switched on, and the supply amount depends on the position of the accelerator pedal; but when the electromagnetic fuel line throttle valve G is closed, the accelerating fuel supply is switched off, but the idle fuel supply is not affected.

According to the present invention, the electronic control clutch 7 of the electronic control fuel saving clutch device 5 and the electromagnetic fuel line throttle valve G are controlled by the brake switch 8 and signals emitted by the accelerator sensor 9 in order to control the engagement and disengagement between the vehicle engine 1 and the wheels 6 as well as the switching on and switching off of the accelerating fuel supply.

The electronic control clutch 7 can be implemented in various embodiments, some well-known forms in the prior art can be used, such as friction clutch and jaw clutch etc. The engagement and disengagement of the clutch are controlled in an electromagnetic control manner or other equivalent control manner.

The brake switch 8 can also be implemented in various embodiments. For example, a microswitch can be arranged on the brake pedal. When the brake pedal is stepped on, the microswitch is activated at first and generates a signal for electronic control fuel saving clutch device. A travel switch, an inductive switch or a contactless switch can also be adopted.

Accelerator sensor 9 can also be implemented in various embodiments, which are known in the prior art.

Figure 3:
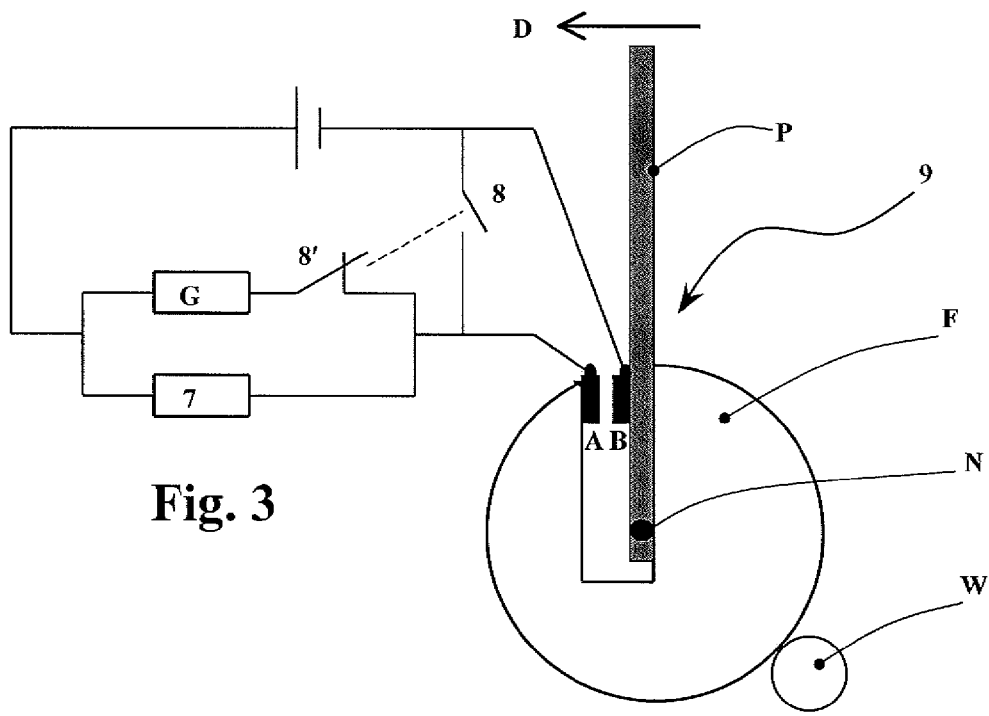
FIG. 3 shows a diagrammatic view of one embodiment of the electronic control fuel saving clutch device according to the present invention.

FIG. 3 shows an embodiment of an electronic control fuel saving clutch device according to the present invention. In FIG. 3, a normally closed switch 8' is controlled by the brake switch. When the brake switch 8 is switched on, the normally closed switch 8' is switched off. When the brake switch 8 is switched off, the normally closed switch 8' is switched on. The brake switch 8 takes precedence for controlling the engagement and disengagement of the electronic control clutch 7 as well as the opening and closing of the electromagnetic fuel line throttle valve G. When the brake switch 8 is switched on, the electronic control clutch 7 is engaged and the electromagnetic fuel line throttle valve G is closed, and the engine is supplied with the idle fuel supply; when the brake switch 8 is switched off, the accelerator sensor 9 controls the electronic control clutch 7 and the electromagnetic fuel line throttle valve G. Switching on the electromagnetic fuel line throttle valve G represents that the engine fuel supply system can supply the engine with the accelerating fuel supply amount decided by the accelerator pedal position; Switching off the electromagnetic fuel line throttle valve G represents that the accelerating fuel supply is cut off and the engine fuel supply system can only supply the engine with the idle fuel supply amount for keeping the engine idling. The accelerator sensor 9 includes a disk F with a groove and a contact A, a contact B arranged on the accelerator pedal P and if necessary a damping wheel W, the contact A on the disk is arranged in the groove, which the contact B on the accelerator pedal faces. Wherein, the rotating axis of the disk is coaxial with the rotating axis of the accelerator pedal. When the accelerator pedal P is rotated forward, the contact B on the accelerator pedal comes into contact with the contact A on the disk and makes the disk F rotate together. When the accelerator pedal comes back, the accelerator pedal disconnects its contact B from the contact A on the disk and makes the disk come back together. When the accelerator pedal goes forward or keeps in a certain forward position, the contact A and the contact B are connected with each other. When the accelerator pedal comes back or keeps in a certain back position, the contact A and the contact B are disconnected from each other. Therefore, the control function of the accelerator sensor is implemented. As described in the drawings, the forward direction of accelerator pedal is indicated by D. When the contact A is connected with the contact B, the electronic control clutch is engaged, and at the same time the electromagnetic fuel line throttle valve G is open for supplying the engine with the accelerating fuel supply. When the contact A is disconnected from the contact B, the electronic control clutch is disengaged, and at the same time the electromagnetic fuel line throttle valve G is closed, the engine is supplied with the idle fuel supply. The damping wheel W makes the disk F get some resistances during rotation, so that the disk can overcome disturbance when it is not affected by external forces and keep the position steady. The disk can also get rotary damping in other constructional manner. In this case, the damping wheel can be cancelled.

Figure 4:
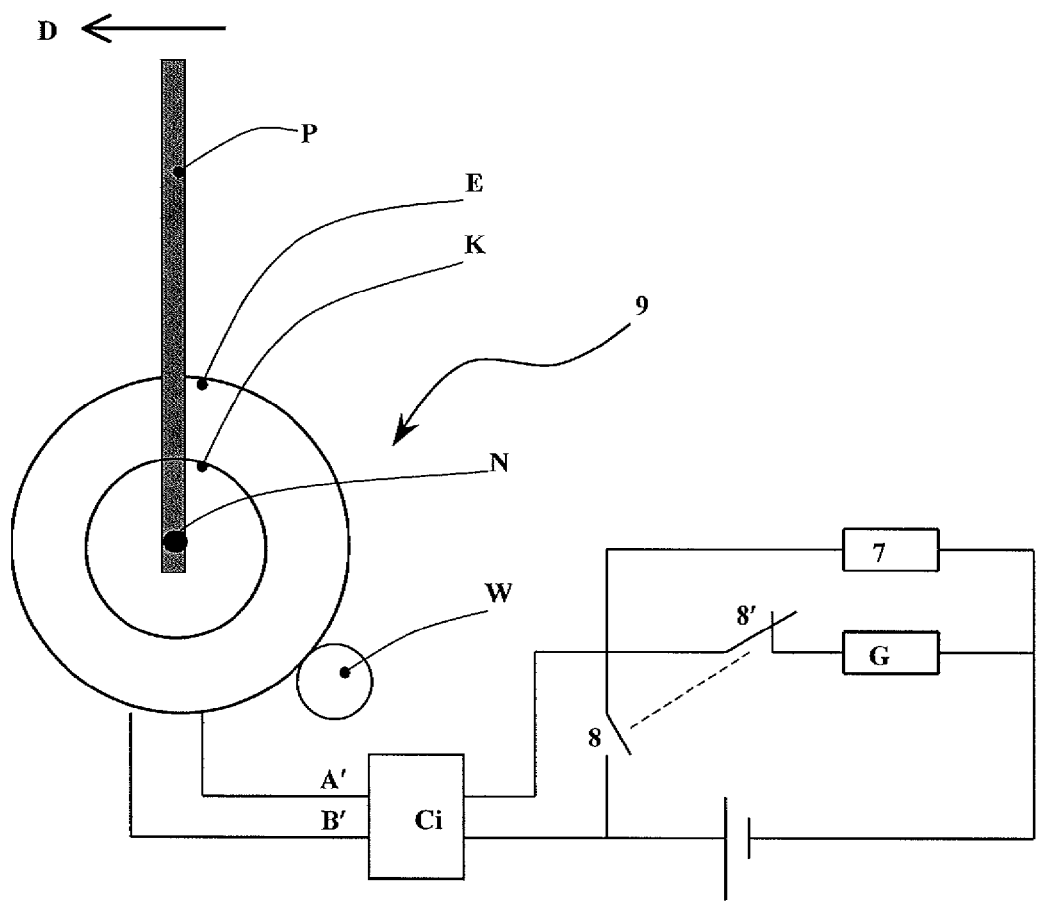
FIG. 4 shows a diagrammatic view of another embodiment of the electronic control fuel saving clutch device according to the present invention.

FIG. 4 shows another embodiment of the electronic control fuel saving clutch device according to the present invention. Similar to previous embodiment, the brake switch 8 takes precedence for controlling the engagement and disengagement of the electronic control clutch 7 as well as the opening and closing of the electromagnetic fuel line throttle valve G. When the brake switch 8 is switched on, the electronic control clutch 7 is engaged and the electromagnetic fuel line throttle valve G is closed, and the engine is supplied with the idle fuel supply; when the brake switch 8 is switched off, the accelerator sensor 9 controls the electronic control clutch 7 and the electromagnetic fuel line throttle valve G. The accelerator sensor 9 is designed as a direct current generator, which is arranged on the rotating axis N of the accelerator pedal P, wherein, K is the rotor of the generator, E is the stator of the generator, A' and B' are the lead wires respectively. When the accelerator pedal goes forward, an electromotive force is outputted, wherein A' is positive and B' is negative. This electromotive force is converted to a switching on signal through a circuit Ci so as to control the engagement of the electronic control clutch. Even if the accelerator pedal is kept in a certain position when going forward, this switching on signal is still effective. When the accelerator pedal comes back, an electromotive force is outputted, wherein A' is negative and B' is positive. This electromotive force is converted to a cutting off signal through a circuit Ci so as to control the disengagement of the electronic control clutch. Even if the accelerator pedal is kept in a certain position when coming back, this cutting off signal is still effective. The switching on signal makes the electronic control clutch 7 engaged and the electromagnetic fuel line throttle valve G open; the cutting off signal makes the electronic control clutch 7 disengaged and the electromagnetic fuel line throttle valve G closed.

Figure 5:
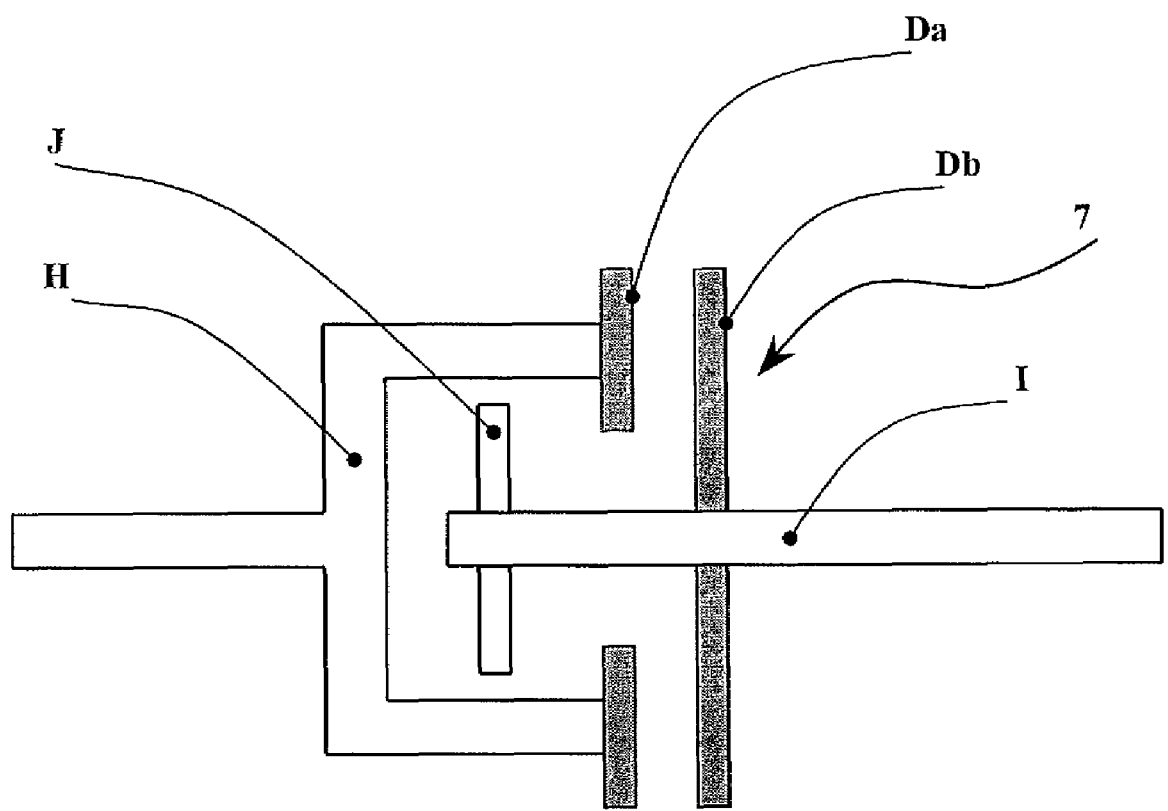
FIG. 5 shows a diagrammatic view of an application of the electronic control fuel saving clutch device according to the present invention to a vehicle equipped with overrunning clutches.

FIG. 5 shows an application of the electronic control fuel saving clutch device according to the present invention to a vehicle equipped with overrunning clutches according to the prior art, such as an embodiment of an application to the device described by Chinese patent ZL02282639.4. In FIG. 5, H indicates the overrunning end of the overrunning clutch, and I indicates the shaft end of the overrunning clutch. According to the prior art, when the shaft end I rotates towards a prescriptive direction, the overrunning end H is rotated together through ratchet wheel J. When the rotating speed of the overrunning end H exceeds the rotating speed of the shaft end, the rotation of overrunning end H is not restricted by the shaft end I; when the shaft end rotates towards a direction which is opposite to the prescriptive direction, the overrunning end can not be rotated together, so that the vehicle equipped only with the device described by this patent can not move backward. According to the present invention, the friction plates Da on one end of the electronic control clutch 7 are arranged on the overrunning end H of the overrunning clutch, and the friction plates Db on the other end of the electronic control clutch 7 are arranged on the shaft end I. When the friction plates Da, Db are pressed each other, the shaft end and the overrunning end of the overrunning clutch lockup. When the accelerator pedal P comes back or keeps in a certain back position, the friction plates Da, Db of the electronic control clutch 7 are separated from each other, just at this time, the overrunning end H can rotate over the shaft end I.

The invention claimed is:

1. An electronic control fuel saving clutch device for a vehicle, comprising:

an electronic control clutch (7), a brake switch (8), an accelerator sensor (9), characterized in that the electronic control fuel saving clutch device (5) is further provided with an electromagnetic fuel line throttle valve (G) for opening and closing the accelerating fuel supply; the electronic control clutch (7) and the electromagnetic fuel line throttle valve (G) are controlled by the brake switch and signals emitted by the accelerator sensor in order to control the engagement or disengagement between the vehicle engine (1) and wheels (6) as well as the accelerating fuel supply of the engine; the specific control manner is: when the brake switch is switched on, the electronic clutch is engaged, and the electromagnetic fuel line throttle valve is closed, and the engine is supplied only with the idle fuel supply; when the brake switch is switched off, if the accelerator sensor (9) detects that the accelerator pedal (P) goes forward or keeps in a certain forward position, the electronic control clutch is engaged and the electromagnetic fuel line throttle valve is open, then the accelerating fuel supply is switched on, and the engine is supplied with the accelerating fuel supply; if the accelerator sensor (9) detects that the accelerator pedal (P) comes back or keeps in a certain back position, the electronic control clutch is disengaged, and the electromagnetic fuel line throttle valve is closed, then the accelerating fuel supply of the engine is cut off, and the engine is supplied only with the idle fuel supply.

2. The electronic control fuel saving clutch device of claim 1, characterized in that the electronic control clutch (7) is arranged downstream of the engine in the transmission system.

3. The electronic control fuel saving clutch device of claim 2, characterized in that the electronic control clutch (7) is arranged on the rearmost stage transmission shaft in the transmission system.

4. The electronic control fuel saving clutch device of claim 1, characterized in that the electronic control clutch (7) is a friction clutch or a jaw clutch.

5. The electronic control fuel saving clutch device of claim 1 or 4, characterized in that the electronic control clutch (7) is engaged or disengaged in an electromagnetic control manner.

6. The electronic control fuel saving clutch device of claim 1, characterized in that the brake switch (8) is a microswitch, a travel switch, an inductive switch or a contactless switch arranged on the brake pedal.

7. The electronic control fuel saving clutch device of claim 1, characterized in that the accelerator sensor (9) includes a disk (F) with a groove and a contact (A), a contact (B) arranged on the accelerator pedal (P), the contact (A) on disk (F) is arranged in the groove, which the contact (B) on the accelerator pedal (P) faces, the rotating axis of the disk (F) is coaxial with the rotating axis of the accelerator pedal (P); when the accelerator pedal is rotated forward, the contact on the accelerator pedal comes into contact with the contact on the disk and makes the disk rotate together; when the accelerator pedal comes back, the accelerator pedal disconnects its contact from the contact on the disk and makes the disk come back together.

8. The electronic control fuel saving clutch device of claim 7, characterized in that the accelerator sensor (9) further includes a damping wheel (W).

9. The electronic control fuel saving clutch device of claim 1, characterized in that the accelerator sensor (9) is designed as a direct current generator, which is arranged on the rotating axis (N) of the accelerator pedal (P), wherein the direct current generator comprises a rotor (K) and a stator (E), and the rotor shaft is connected with the rotating axis of the accelerator pedal coaxially fixedly or through a gearing mechanism, and when the accelerator pedal rotates, the rotor rotates together; when the accelerator pedal goes forward or comes back, the direct current generator outputs an electromotive force with reverse polarity respectively; this electromotive force is converted to a corresponding switching on signal or a corresponding cutting off signal through a circuit (Ci), and even if the accelerator pedal is kept on a certain position when going forward or coming back, this switching on signal or cutting off signal is still effective.

10. The electronic control fuel saving clutch device of claim 1, characterized in that the electronic control fuel saving clutch device is arranged in an overrunning clutch, wherein the friction plates (Da) on one end of the electronic control clutch (7) which can not rotate but can move axially with respect to an overrunning end (H) of the overrunning clutch are arranged on this overrunning end (H); and the friction plates (Db) on the other end of the electronic control clutch (7) which can not rotate but can also move axially with respect to a shaft end (I) are arranged on this shaft end (I).

* * * * *